United States Patent
Mnih et al.

(10) Patent No.: US 10,936,946 B2
(45) Date of Patent: *Mar. 2, 2021

(54) ASYNCHRONOUS DEEP REINFORCEMENT LEARNING

(71) Applicant: DeepMind Technologies Limited, London (GB)

(72) Inventors: Volodymyr Mnih, London (GB); Adrià Puigdomènech Badia, London (GB); Alexander Benjamin Graves, London (GB); Timothy James Alexander Harley, London (GB); David Silver, Hitchin (GB); Koray Kavukcuoglu, London (GB)

(73) Assignee: DeepMind Technologies Limited, London (GB)

( * ) Notice: Subject to any disclaimer, the term of this patent is extended or adjusted under 35 U.S.C. 154(b) by 1087 days.

This patent is subject to a terminal disclaimer.

(21) Appl. No.: 15/349,950

(22) Filed: Nov. 11, 2016

(65) Prior Publication Data

US 2017/0140270 A1 May 18, 2017

Related U.S. Application Data

(60) Provisional application No. 62/254,701, filed on Nov. 12, 2015.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01); *G06N 3/0454* (2013.01)

(58) Field of Classification Search
CPC .......... G06N 3/08; G06N 3/04; G06N 3/0454
See application file for complete search history.

(56) References Cited

U.S. PATENT DOCUMENTS

| | | | |
|---|---|---|---|
| 2010/0094786 A1 | 4/2010 | Gupta et al. | |
| 2013/0080377 A1* | 3/2013 | Newnham | G06N 20/00 706/52 |
| 2014/0180975 A1 | 6/2014 | Martinze et al. | |

(Continued)

FOREIGN PATENT DOCUMENTS

| | | |
|---|---|---|
| JP | 09081205 | 3/1997 |
| JP | 2009064216 | 3/2009 |
| WO | WO2017083772 | 5/2017 |

OTHER PUBLICATIONS

Mnih, Volodymyr, et al. "Playing atari with deep reinforcement learning." arXiv preprint arXiv:1312.5602 (2013). (Year: 2013).*

(Continued)

*Primary Examiner* — Eric Nilsson
(74) *Attorney, Agent, or Firm* — Fish & Richardson P.C.

(57) ABSTRACT

Methods, systems, and apparatus, including computer programs encoded on computer storage media, for asynchronous deep reinforcement learning. One of the systems includes a plurality of workers, wherein each worker is configured to operate independently of each other worker, and wherein each worker is associated with a respective actor that interacts with a respective replica of the environment during the training of the deep neural network.

20 Claims, 5 Drawing Sheets

(56) References Cited

U.S. PATENT DOCUMENTS

2015/0100530 A1 4/2015 Mnih et al.
2015/0294219 A1 10/2015 Krizhevsky

OTHER PUBLICATIONS

Tan, Ming. "Multi-agent reinforcement learning: Independent vs. cooperative agents." Proceedings of the tenth international conference on machine learning. 1993. (Year: 1993).*
Baird III, Leemon C., and Andrew W. Moore. "Gradient descent for general reinforcement learning." Advances in neural information processing systems. 1999. (Year: 1999).*
El-Tantawy, Samah, et al. "Multiagent reinforcement learning for integrated network of adaptive traffic signal controllers (MARLIN-ATSC): methodology and large-scale application on downtown Toronto." IEEE Transactions on Intelligent Transportation Systems 14.3 (2013): 1140-1150 (Year: 2013).*
KR Office Action in Korean Appln. No. 10-2018-7013091, dated Jan. 20, 2020, 12 pages (with English translation).
Ong et al., "Distributed Deep Q-Learning," arXiv preprint arXiv:1508.04186v2, last revised Oct. 2015, 8 pages.
Bellemare et al. "The arcade learning environment: An evaluation platform for general agents," Journal of Artificial Intelligence Research, Jun. 2012, 27 pages.
Bellemare et al. "Increasing the action gap: New operators for reinforcement learning," arXiv preprint arXiv1512.04860, Dec. 15, 2015, 14 pages.
Bertsekas. "Distributed dynamic programming," IEEE Transaction on Automatic Control 27(3), Jun. 1982, 7 pages.
Chavez et al. "Distributed deep q-learning," arXiv preprint arXiv1508.04186, Aug. 18, 2015, 8 pages.
Degris et al. "Model-free reinforcement learning with continuous action in practice," American Control Conference. Jun. 27, 2012, 7 pages.
Grounds et al. "Parallel reinforcement learning with linear function approximation," Proceedings of the $5^{th}$, $6^{th}$, and $7^{th}$ European Conference on Adaptive and Learning Agents and Multi-agent Systems: Adaptation and Multi-agent Learning, Springer-Verlag, 2008, 3 pages.
Koutnik et al. "Evolving deep unsupervised convolutional networks for vision-based reinforcement learning," Proceedings of the 2014 Conference on Genetic and evolutionary computation, ACM, Jul. 12, 2014, 8 pages.
Levine et al. "End-to-end training of deep visuomotor policies," Journal of Machine Learning Research 17.39, Jan. 2016, 40 pages.
Li et al. "Mapreduce for parallel reinforcement learning," Recent Advances in Reinforcement Learning—$9^{th}$ European Workshop, EWRL 2011, Athens, Greece, Sep. 9-11, 2011, Revised Selected Papers, 2011, 12 pages.
Lillicrap et al. "Continuous control with deep reinforcement learning," arXiv preprint arXiv 1509.02971, Sep. 9, 2015, 14 pages.
Mnih et al. "Playing Atari with deep reinforcement learning," arXiv preprint arXiv:1312.5602, Dec. 19, 2013, 9 pages.
Mnih et al. Human-level control through deep reinforcement learning. Nature, 518 (7540), Feb. 26, 2015, 13 pages.
Nair et al. "Massively parallel methods for deep reinforcement learning," arXiv preprint arXiv1507.04296, Jul. 15, 2015, 14 pages.
Peng et al. "Incremental multi-step q-learning," Machine Learning 22(1-3), Jan. 1, 1996, 8 pages.
Recht et al. "Hogwild: A lock-free approach to parallelizing stochastic gradient descent," Advances in Neural Information Processing Systems, 2011, 9 pages.
Reidmiller. "Neural fitted 1 iteration-first experiences with a data efficient neural reinforcement learning method," Machine Learnin: ECML 2005, Spring Berlin Heidelberg, 2005, 12 pages.
Schaul et al. "Prioritized experience replay," arXiv preprint arXiv: 1511.05952, Nov. 18, 2015, 21 pages.
Schulman et al. "Trust region policy optimization," International Conference on Machine Learning (ICML), Feb. 19, 2015, 9 pages.
Schulman et al. "High-dimensional continuous control using generalized advantage estimation," arXiv preprint arXiv1506.02438, 2015, 14 pages.
'www.cs.toronto.edy' [online] "Neural Networks for Machine Learning: Lecture 6a Overview of mini-batch gradient descent," Hinton et al. [retrieved on Feb. 16, 2017] Retrieved from Internet URL<http://www.cs.toronto.edu/~tijmen/csc321/slides/lecture_slides_lec6.pdf> 31 slides.
Tomassini. "Parallel and distributed evolutionary algorithms: A review," Technical report, 1999, 25 pages.
Tsitsiklis. "Asynchronous stochastic approximation and q-learning," Machines Learning, 16(3), Sep. 1, 1994, 18 pages.
Van Hasselt et al. "Deep reinforcement learning with double q-learning," arXiv preprint arXiv1509.06461v3, Dec. 8, 2015, 13 pages.
Van Seijen et al. "True Online Temporal-Difference Learning," Journal of Machines Learning Research 17.145, Jan. 1, 2016, 40 pages.
Wang et al. "Dueling Network Architectures for Deep Reinforcement Learning," arXiv preprint arXiv1511.06581v3, Apr. 4, 2016, 15 pages.
Watkins et al "Learning from Delayed rewards," PhD thesis, University of Cambridge England, 1989, 241 pages.
Williams. "Simple statistical gradient following algorithms for connectionist reinforcement learning," Machines Learning 8(3), May 1, 1992, 28 pages.
Williams et al. "Function optimization using connectionist reinforcement learning algorithms," Connection Science 3(3), Jan. 1, 1991, 29 pages.
Wymann et al. "torcs: The open racing car simulator," Software available ar http://torcs.Sourceforge.net , 2000, 5 pages.
EP Office Action in European Application No. 16805618.2, dated Jun. 21, 2019, 3 pages.
AU Office Action in Australia Appln. No. 2016354558, dated Aug. 15, 2019, 3 pages.
AU Office Action in Australia Appln. No. 2016354558, dated Feb. 5, 2019, 3 pages.
International Search Report and Written Opinion in International Application No. PCT/US2016/061698, dated Feb. 24, 2017, 13 pages.
Ong and Chavez et al. "Distributed Deep Q-learning," CME 323: Distributed Algorithms and Optimization, Spring 2015, Stanford University, Aug. 17, 2015, 8 pages.
Printista et al. "A parallel implementation of Q-learning based on communication with cache," Journal of Computer Science & Technology, May 1, 2002, 11 pages.
JP Office Action in Japanese Application No. 2018-523817, dated Jul. 8, 2019, 8 pages (with English translation).
The Institute of Electrical Engineers of Japan, "Learning and its Algorithm" [POD version], Morikita Publishing Co., Ltd., Jan. 20, 2012, 24 pages (with partial English translation).
Shinozuka et al, "Construction of reinforcement learning method in consideration of knowledge applicable to different environments", 6th DEIM (Data Engineering and Infolmation Management) Form (12th Meeting of the Data Base Society of Japan), the Data Engineering Research Committee in the Institute of Electronics, Infolmation and Communication Engineers, the Data Engineering and Infolmation Management of Japan, Data Base System Study Group in the Infolmation Processing Society of Japan, Mar. 5, 2014, 9 pages (with partial English translation).
Baird et al., "Gradient descent for general reinforcement learning." Advances in neural information processing systems, year 1999, 7 pages.
Tan, "Multi-agent reinforcement learning: Independent vs. cooperative agents." Proceedings of the tenth international conference on machine learning. Year 1993, 8 pages.
KR Notice of Allowance in Korean Appln. No. 10-2018-7013091, dated Jul. 14, 2020, 4 pages (with English translation).
IN Office Action in Indian Appln. No. 201847017213, dated Oct. 1, 2020, 6 pages (with English translation).

* cited by examiner ively select actions to be performed by the agent, a
neural network training system trains the deep neural net-
ASYNCHRONOUS DEEP REINFORCEMENT LEARNING

CROSS-REFERENCE TO RELATED APPLICATION

This application claims priority to U.S. Provisional Application No. 62/254,701, filed on Nov. 12, 2015. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes technologies that relate to reinforcement learning. In particular, this specification describes techniques for asynchronously training a deep neural network used by a reinforcement learning system to select actions to be performed by an agent when interacting with an environment.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. By parallelizing training, a neural network used by a reinforcement learning system can be trained faster. More particularly, by parallelizing the training using multiple workers operating independently on a single machine, communication costs incurred as a result of the parallelization can be reduced. Additionally, by removing the need for the workers to store experience tuples in a replay memory or other storage as is generally required in parallelization techniques that include multiple workers on multiple machines, memory requirements for the training can be reduced and on-policy reinforcement learning methods can be employed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
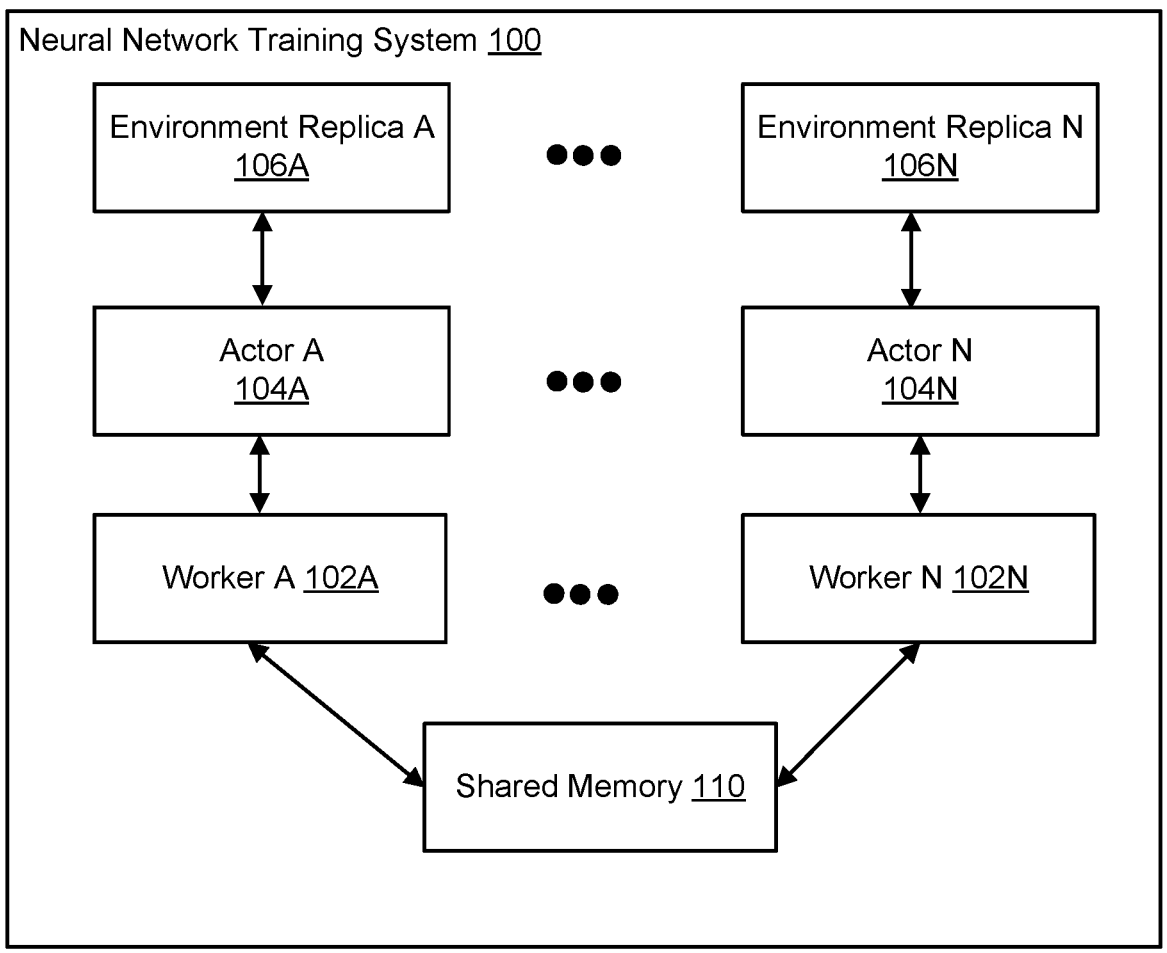
FIG. 1 shows an example neural network training system.

This specification generally describes techniques for asynchronous deep reinforcement learning. In particular, this specification describes how multiple workers can asynchronously train a deep neural network used by a reinforcement learning system to select actions to be performed by an agent interacting with an environment.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these implementations, the actions may be control inputs to control the robot or the autonomous vehicle.

Generally, the reinforcement learning system receives observations characterizing the current state of the environment and selects actions to be performed by the agent using the observations. In response to the agent performing a selected action, the environment transitions into a new state and the reinforcement learning system receives a reward. The reward is a numeric value that is a function of the state of the environment. While interacting with the environment, the reinforcement learning system attempts to maximize the long-term reward received by the agent in response to the actions performed by the agent.

In particular, in response to a given observation, the reinforcement learning system selects the action to be performed by the agent in accordance with an output generated by a deep neural network.

In order to allow the reinforcement learning system to effectively select actions to be performed by the agent, a neural network training system trains the deep neural network to adjust the values of the parameters of the deep neural network from initial values of the parameters.

In particular, the neural network training system includes multiple workers that asynchronously train the deep neural network by selecting actions to be performed by actors interacting with replicas of the environment.

Each actor is an instance of the agent that operates independently from each other instance. For example, when the agent is a mechanical agent, each actor is also a separate mechanical agent that is the same as or is approximately the same as the agent, e.g., has the same or approximately the same properties and can perform the same actions as the agent, and operates independently from each other actor.

FIG. 1 shows an example neural network training system 100. The neural network training system 100 is an example of a system implemented as computer programs on one or more computers in one or more locations in which the systems, components, and techniques described below are implemented.

The neural network training system 100 includes multiple workers 102A-N and a shared memory 110. Each of the workers 102A-102N is associated with a respective actor 104A-N that interacts with a corresponding environment replica 106A-106N. For example, the worker 102A is associated with the actor 104A that interacts with the environment replica 106A.

In some implementations, each of the workers 110A-N is implemented on the same computer but executes in a separate thread, process or other hardware or software within the computer capable of independently performing the computation for the worker. In these implementations, the shared memory 110 is memory of the computer that is accessible to each of the workers 102A-102N. In implementations where the environment is a virtualized environment, the actor and environment replica associated with a given worker also execute in the same thread or other hardware or software as the given worker.

Each of the workers 102A-102N maintains an instance of the deep neural network that is being trained and accesses the shared memory 110 to obtain current values of the parameters of the deep neural network that are stored in the shared memory 110. Each worker then uses the worker's instance of the deep neural network to select actions to be performed by the actor associated with the worker in accordance with the current values of the parameters of the neural network obtained from the shared memory 110.

In particular, during the training, each worker receives observations characterizing the state of the environment replica associated with the worker and, in response to each observation, selects an action to be performed by the actor associated with the environment replica using the deep neural network. The worker then receives a next observation characterizing the next state of the environment replica, i.e., the state that the environment replica transitions into as a result of the actor performing the selected action, and a reward resulting from the actor performing the selected action. The worker uses the reward and the next observation to determine a gradient and periodically uses gradients determined by the worker to update the parameter values that are stored in the shared memory 110. Determining gradients and updating parameter values stored in a shared memory is described in more detail below with reference to FIG. 2.

By each of the workers 102A-102N repeatedly and asynchronously updating the parameter values stored in the shared memory 110, the workers 102A-102N collectively train the deep neural network to determine trained values of the parameters of the deep neural network.

Figure 2:
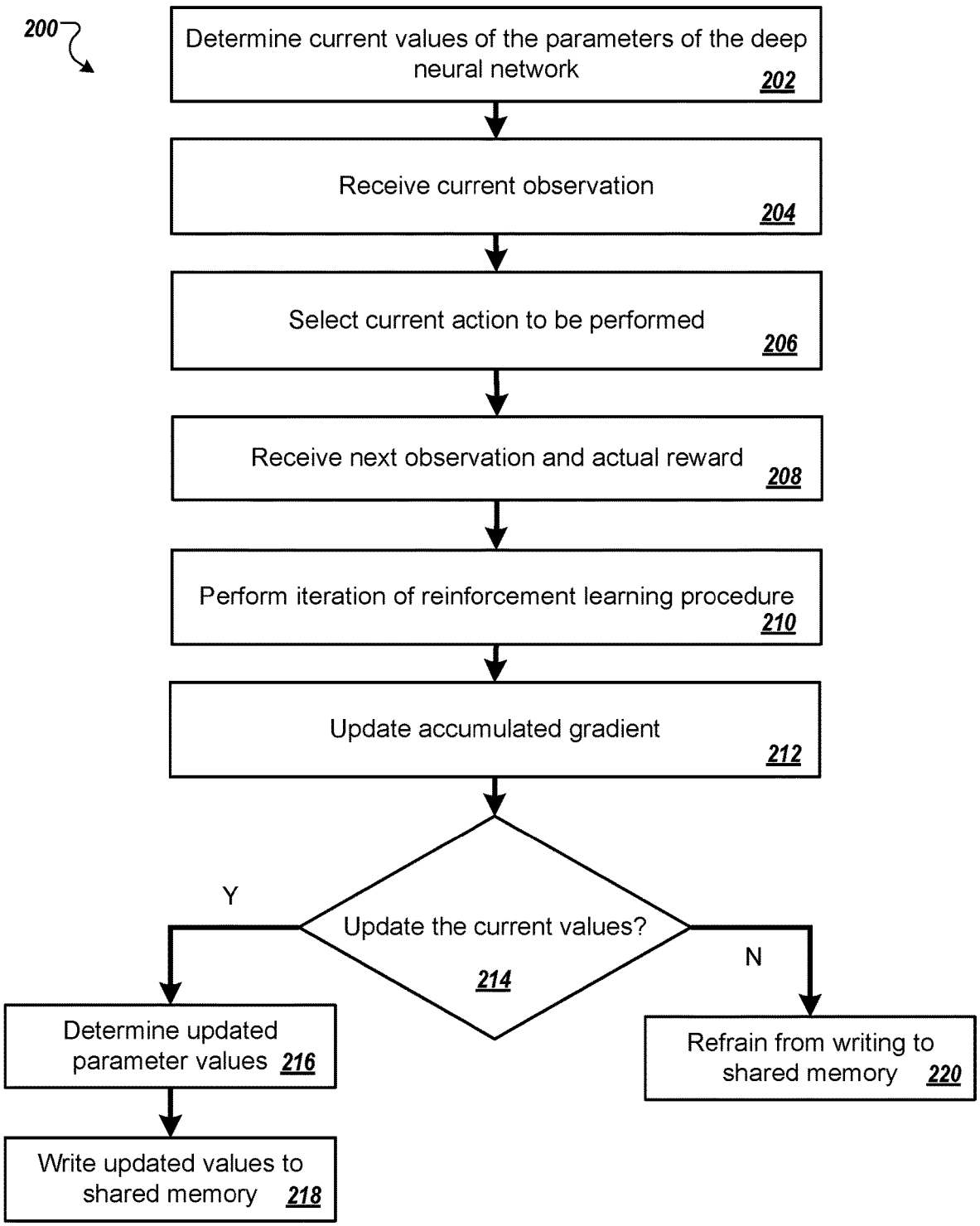
FIG. 2 is a flow diagram of an example process for training a deep neural network.

FIG. 2 is a flow diagram of an example process 200 for training a deep neural network. For convenience, the process 200 will be described as being performed by a worker, e.g., one of the workers 120A-N of FIG. 1.

The worker determines current values of the parameters of the deep neural network (step 202).

In some implementations, the worker obtains the current values from a memory shared between all of the workers, e.g., the shared memory 110 of FIG. 1.

In some other implementations, the worker only obtains the current values from the memory after updating the shared memory as described below and writes them to a local memory. In these implementations, the worker determines the current values to be the values stored in the local memory.

The worker receives a current observation characterizing a current state of the environment replica being interacted with by the actor associated with the worker (step 204).

The worker selects a current action to be performed by the actor when the environment is in the current state using the deep neural network (step 206).

In particular, in some implementations, the deep neural network is a Q network that is configured to receive as an input an observation and an action and to process the input to generate a neural network output in accordance with the current values of the parameters of the Q network. The neural network output, which will be referred to in this specification as a Q value, is an estimate of a long-term reward that will result from an agent or an actor performing the input action when the environment is in a state characterized by the input observation.

In these implementations, for each action in the predetermined set of actions, the worker processes the action and the current observation using the Q network to generate a respective current Q value for each action.

The worker then selects an action from the predetermined set of actions as the current action to be performed by the actor using the current Q values and in accordance with an action selection policy for the worker.

Generally, the action selection policy for a given worker is different from the action selection policy for each other worker. For example, in some implementations, the action selection policy for each worker is an $\varepsilon$-greedy policy in which the worker selects an action randomly from the predetermined set of actions with probability $\varepsilon$ and selects the action having the highest Q value with probability $1-\varepsilon$, but with the value of $\varepsilon$ being different for each worker. For example, each worker can periodically sample a value for $\varepsilon$ for the worker from a distribution of possible values of $\varepsilon$ for the worker to determine the $\varepsilon$ to be used in the action selection policy. As another example, the worker could select the action by applying a softmax nonlinearity to the Q values and sampling an action from the resulting distribution. Each worker could then use a different temperature parameter in the softmax to ensure that each worker had a different action selection policy.

The worker receives a next observation and an actual reward (step 208). The next observation characterizes a next state of the environment replica, i.e., the state that the environment replica transitioned into as a result of the actor associated with the worker performing the current action. The actual reward is a numeric value that is received from the environment replica as a result of the transition from the current state into the next state.

The worker performs an iteration of a reinforcement learning procedure to determine a current gradient using the actual reward and the next observation (step 210). The gradient is the gradient of a loss function being optimized in order to train the deep neural network.

The loss function and the manner in which the worker determines the gradient are dependent on the reinforcement learning procedure being used to train the deep neural network, which is in turn dependent on how the deep neural network is configured.

For example, when the deep neural network is a Q network, the workers may use a Q-learning technique or a SARSA technique. Performing an iteration of a Q-learning technique is described below with reference to FIG. 3. Performing an iteration of a SARSA technique is described below with reference to FIG. 4.

The worker updates an accumulated gradient with the current gradient to determine an updated accumulated gradient (step 212). That is, the worker maintains a gradient in local memory and, each time a new gradient is computed, updates the maintained gradient with the new gradient, e.g., by adding the new gradient to the accumulated gradient.

The worker determines whether criteria for updating the current values of the parameters of the neural network are satisfied (step 214). For example, the criteria for updating the current values may specify that the worker update the current values after the worker has performed a specified number of reinforcement learning iterations since the most recent time the worker updated the parameter values. As another example, the criteria may specify that the worker update the current values when the total number of reinforcement learning iterations performed by all of the multiple workers since the most recent time the workers updated the parameter values exceeds a specified threshold value.

If the criteria are satisfied, the worker determines updated parameter values using the accumulated gradients (step 216) and writes the updated parameter values to the shared memory (step 218). In particular, the worker determines parameter value updates from the accumulated gradients, accesses the current values in the shared memory, and then updates those values using the parameter value updates. In some examples, the worker multiplies the accumulated gradients by a learning rate parameter and then sums the current parameter values and the parameter value updates to determine the updated parameter values. In some other examples, the worker uses an asynchronous variant of the RMSProp optimization procedure to update the parameter values.

After the worker writes the updated parameter values to the shared memory, the worker clears the accumulated gradient, i.e., so that no gradient is maintained by the worker when the next iteration of the process 200 is initiated.

If the criteria are not satisfied, the worker refrains from writing anything to the shared memory (step 220), i.e., the worker proceeds to perform another iteration of the process 200 without updating the current parameter values.

Each of multiple workers can asynchronously repeatedly perform the process 200 to collectively determine trained values of the parameters of the deep neural network. Once the trained values have been determined, a reinforcement learning system can use the deep neural network to select values to be performed by an agent interacting with the environment, i.e., by processing neural network inputs using the deep neural network in accordance with the trained values of the neural network parameters. In some other cases, the reinforcement learning system uses the deep neural network to select values to be performed by the agent while the workers continue to perform the process 200, i.e., by periodically obtaining the values stored in the shared memory and using those values to select the actions performed by the agent.

In some cases, once the trained values have been determined, they are stored and then transmitted over a network to another system for use in instantiating a trained version of the deep neural network, i.e., to allow an agent to effectively select actions in interacting with the environment.

Figure 3:
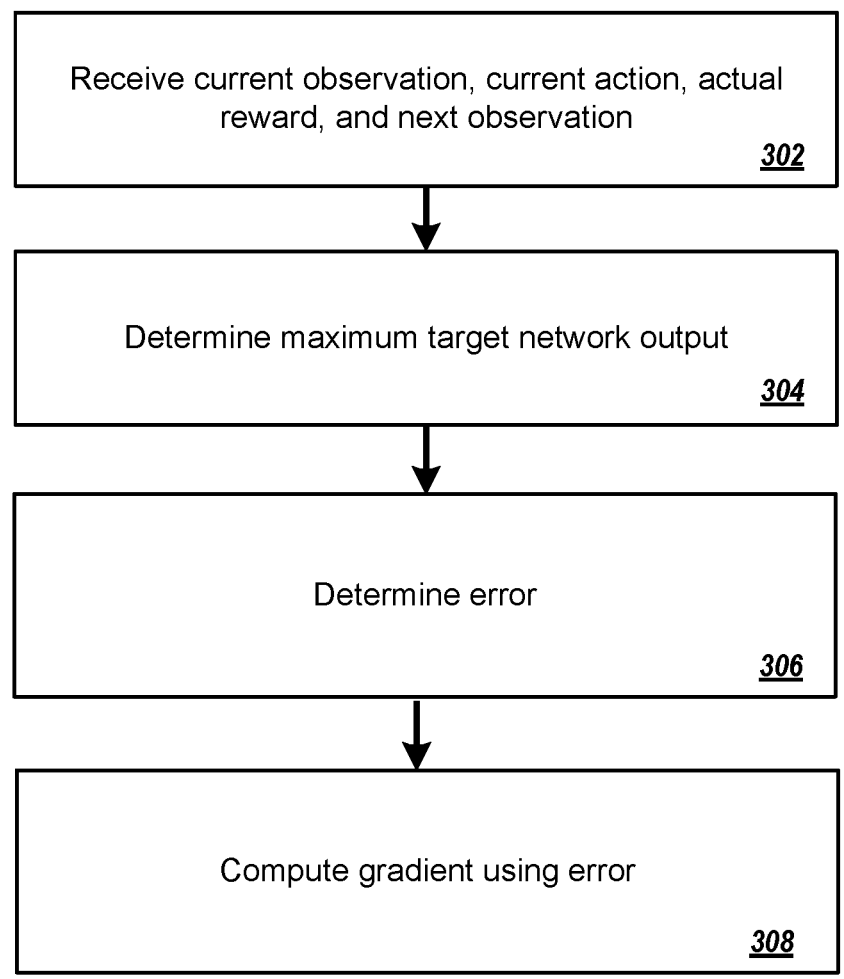
FIG. 3 is a flow diagram of an example process for performing an iteration of a Q-learning technique.

FIG. 3 is a flow diagram of an example process 300 for performing an iteration of a Q-learning technique. For convenience, the process 300 will be described as being performed by a worker, e.g., one of the workers 102A-N of FIG. 1.

The worker obtains the current observation, the current action, the actual reward, and the next observation (step 302), i.e., as described above with reference to FIG. 2.

The worker determines a maximum output of a target network when the environment replica is in a state characterized by the next observation (step 304). The target network is the same neural network as the Q network, i.e., has the same neural network architecture/neural network form, but with possibly different parameter values. In particular, each worker periodically synchronizes the values of the parameters of the target network with the current values of the parameters of the Q network stored in the shared memory. Generally, however, the worker synchronizes the values of the parameters of the target network less frequently than the worker updates the parameter values stored in the shared memory, so that the target network and the Q network will often have different parameter values.

The worker determines the maximum output of the target network by, for each action in the predetermined set of actions, processing the action in combination with the next observation using the target network to determine a target network output for the action. The system then selects the maximum of the target network outputs for the actions in the predetermined set of actions as the maximum output of the target network.

The worker determines an error from the maximum output of the target network, the actual reward, and the current Q value previously determined for the current action when the environment was in the current state, i.e., the current Q value used to select the current action as the action to be performed when the environment was in the current state (step 306). In some implementations, the error E satisfies:

$$E = r + \gamma \max(Q^{target}) - Q^{current},$$

where r is the actual reward, γ is a predetermined discount factor, $\max(Q^{target})$ is the maximum output of the target network, and $Q^{current}$ is the current Q value previously determined for the current action when the environment was in the current state.

The worker determines the current gradient using the determined error (step 308). That is, the worker updates the values using backpropagation, with the backpropagated error being the determined error for the selected action and zero for all other actions.

Figure 4:
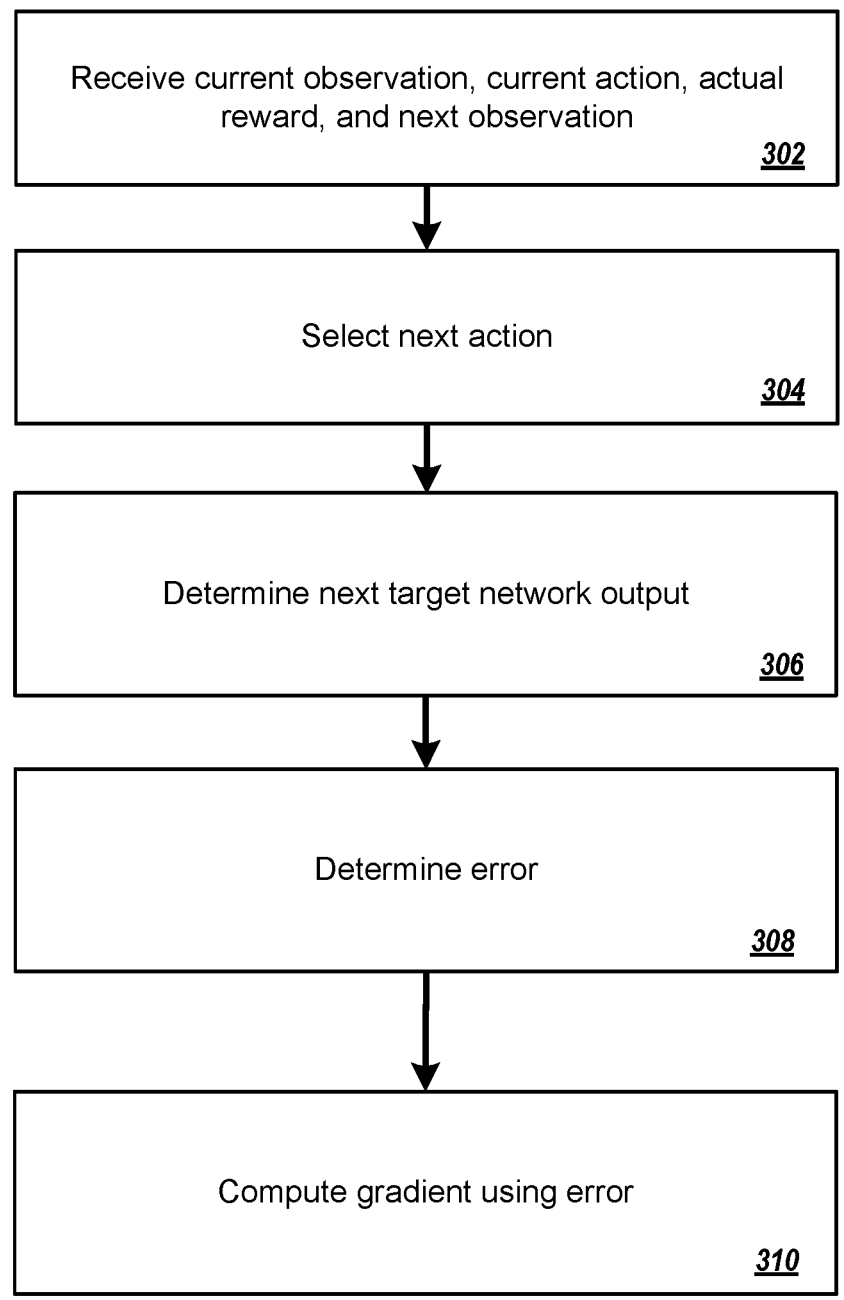
FIG. 4 is a flow diagram of an example process for performing an iteration of a SARSA technique.

FIG. 4 is a flow diagram of an example process 400 for performing an iteration of a SARSA technique. For convenience, the process 400 will be described as being performed by a worker in a neural network training system, e.g., one of the workers 102A-N in the neural network training system 100 of FIG. 1.

The worker receives the current observation, the current action, the actual reward, and the next observation (step 402).

The worker selects a next action to be performed by the actor when the environment replica is in the next state (step 404). The worker selects the next action as described above with reference to step 206. That is, for each action in the predetermined set of actions, the worker processes the action and the next observation using the Q network to generate a respective next Q value for each action. The worker then selects an action from the predetermined set of actions as the next action to be performed by the actor using the next Q values and in accordance with the action selection policy for the worker.

The worker determines a target network output for the next action (step 406). That is, the worker processes the next action and the next observation using the target network to determine the target network output for the next action.

The worker determines an error from the target network output for the next action, the actual reward, and the current Q value previously determined for the current action (step 406). In some implementations, the error E satisfies:

$$E = r + \gamma Q^{target} - Q^{current},$$

where r is the actual reward, γ is a predetermined discount factor, $Q^{target}$ is the target network output for the next action, and $Q^{current}$ is the current Q value previously determined for the current action when the environment was in the current state.

The worker determines the current gradient using the determined error (step 408).

When performing either the process 300 or the process 400, the worker also determines whether or not criteria for synchronizing the target network parameters with the parameters in the shared memory are satisfied. For example, the criteria can be the same as the criteria described above with reference to step 216, but with the specified threshold value or the specified number being greater than the value or number used for the determination of whether to update the parameters stored in the shared memory. Thus, the worker synchronizes the values of the parameters of the target network less frequently than the worker updates the parameter values stored in the shared memory, so that the target network and the Q network will often have different parameter values.

The above description has described implementations where the deep neural network is a Q network. In some other implementations, however, the deep neural network is a policy neural network that receives an input observation and outputs a respective score for each action in the predetermined set of actions, where the scores each represent a likelihood that the corresponding action is the action that should be performed to maximize the long-reward that will result from the environment being in the state characterized by the input observation.

In these implementations, to select an action in response to a given observation, the reinforcement learning system processes the given observation using the policy neural network and selects the action to be performed by the agent by sampling from the actions in accordance with the scores for the actions.

To ensure that each worker has a different action selection policy, each worker can use a different random seed when sampling from the actions or, alternatively, each worker can have a different temperature for the output layer of the policy neural network that generates the scores for the actions.

Figure 5:
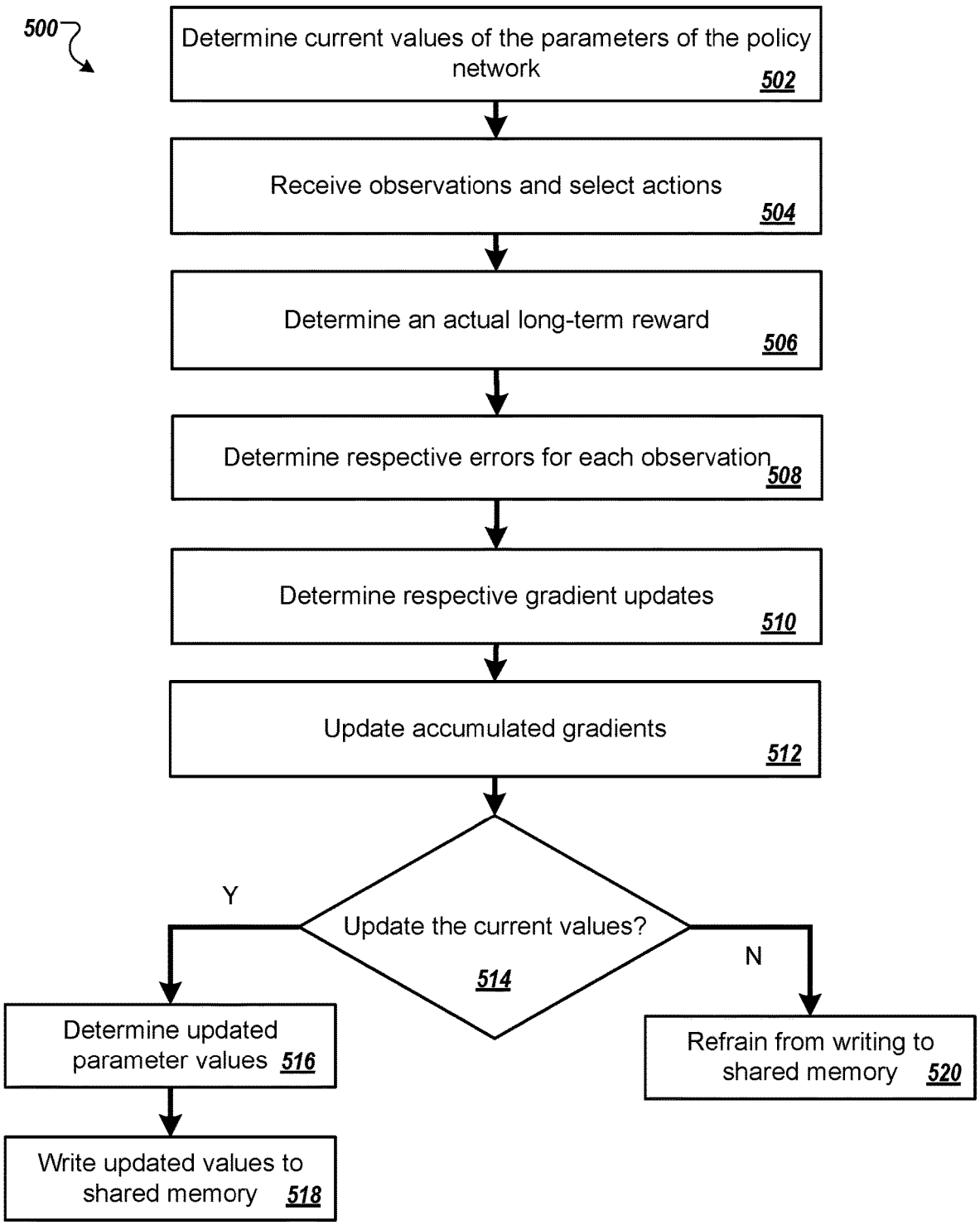
FIG. 5 is a flow diagram of an example process for training a policy neural network.

FIG. 5 is a flow diagram of an example process 500 for training a policy neural network. For convenience, the process 500 will be described as being performed by a worker in a neural network training system, e.g., one of the workers 102A-N in the neural network training system 100 of FIG. 1.

The worker determines current values of the parameters of the policy neural network (step 502). In particular, the worker obtains the current values from a memory shared between all of the workers, e.g., the shared memory 110 of FIG. 1.

The worker also obtains current values of the parameters of a baseline neural network from the shared memory. The baseline neural network is a neural network that is configured to receive an input observation and to generate a baseline score that represents an estimated long-term reward received by the agent starting from the state characterized by the input observation. In some implementations, the baseline and policy networks share some of their parameters.

The worker receives observations characterizing the state of the environment replica and selects actions to be performed by the actor in accordance with the current values of the parameters of the policy neural network until the environment replica transitions into a state that satisfies particular criteria (step 504). That is, for each observation, the processes the observation using the policy neural network in accordance with the current values and selects the action to be performed by the agent by sampling from the actions in accordance with the scores for the actions. For example, the particular criteria may be satisfied after a predetermined number $t_{max}$ of observations have been received or until a predetermined terminal state has been reached.

In particular, for each received observation characterizing the state of the environment replica, the worker processes the observation using the policy neural network to generate a respective score for each action in the predetermined set of actions in accordance with the current values of the parameters of the policy neural network and selects the action to be performed by the actor by sampling from the distribution.

For each received observation, the worker also processes the action and the observation using the baseline neural network to generate a baseline score for the observation in accordance with the current values of the parameters of the baseline neural network.

In some implementations, one or both of the baseline neural network and the policy neural network may be a recurrent neural network.

The worker determines an actual long-term reward for each received observation (step 506).

That is, for the last observation received, the system sets the actual long-term reward to, e.g., the baseline score predicted by the baseline neural network.

For a given observation other than the last observation, the system sets the actual long-term reward for the given observation as the reward received when the environment replica transitioned into the state characterized by the last observation plus a discounted sum of the actual long-term reward for the observations received after the actor performed the action selected in response to receiving the given observation.

The worker determines, for each observation, a respective gradient update for the policy neural network and a respective gradient update for the baseline neural network (step 510).

In particular, the gradient update for the policy neural network for the observation $s_t$ satisfies:

$$\nabla_{\theta'} \log \pi(a_t | s_t; \theta')(R_t - b_t),$$

where $\pi(a_t|s_t;\theta')$ is the score generated for the action performed in response to the observation $s_t$, $R_t$ is the actual long-term reward determined for the observation $s_t$, and $b_t$ is the baseline score for the observation $s_t$.

The gradient update for the baseline neural network for the observation $s_t$ satisfies:

$$\partial(R_t - b(s_t;\theta'_b))^2/\partial\theta'_b,$$

where $b(s_t;\theta'_b)$ is the baseline score for the observation $s_t$.

The worker updates an accumulated gradient for the policy neural network with the gradient updates for the policy neural network to determine an updated accumulated gradient for the policy neural network and updates an accumulated gradient for the baseline neural network with the gradient updates for the baseline neural network to determine an updated accumulated gradient for the baseline neural network (step 512) e.g., by adding the new gradient for each neural network to the accumulated gradient for the neural network.

The worker determines whether criteria for updating the current values of the parameters of the baseline neural network and the policy neural network are satisfied (step 514).

For example, the criteria for updating the current values may specify that the worker update the current values after the worker has performed a specified number iterations of step 504 since the most recent time the worker updated the parameter values.

As another example, the criteria may specify that the worker update the current values when the total number of iterations of step 504 performed by all of the multiple workers since the most recent time the workers updated the parameter values exceeds a specified threshold value.

If the criteria are satisfied, the worker determines updated parameter values for the baseline neural network and the policy neural network using the corresponding accumulated gradients (step 516) and writes the updated parameter values to the shared memory (step 518), e.g., as described above with reference to steps 216 and 218.

After the worker writes the updated parameter values to the shared memory, the worker clears the accumulated gradient, i.e., so that no gradient is maintained by the worker when the next iteration of the process 500 is initiated.

If the criteria are not satisfied, the worker refrains from writing anything to the shared memory (step 520), i.e., the worker proceeds to perform another iteration of the process 500 without updating the current parameter values.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for training a deep neural network used to select actions to be performed by an agent that interacts with an environment by performing actions selected from a predetermined set of actions, the system comprising:
   a shared memory accessible to all of a plurality of workers, wherein the shared memory stores values of parameters of the deep neural network;
   the plurality of workers, wherein each worker is configured to operate independently of each other worker, wherein each worker is associated with a respective actor that interacts with a respective replica of the environment during the training of the deep neural network, and wherein each worker is further configured to repeatedly perform operations comprising:
      determining current values of the parameters of the deep neural network;
      receiving a current observation characterizing a current state of the environment replica interacted with by the actor associated with the worker;
      selecting a current action to be performed by the actor associated with the worker in response to the current observation in accordance with a respective action selection policy for the worker and using one or more outputs generated by the deep neural network in accordance with the current values of the parameters;
      identifying an actual reward resulting from the actor performing the current action when the environment replica is in the current state;
      receiving a next observation characterizing a next state of the environment replica interacted with by the actor, wherein the environment replica transitioned into the next state from the current state in response to the actor performing the current action;
      performing an iteration of a reinforcement learning technique to determine a current gradient using the actual reward and the next observation;
      updating an accumulated gradient with the current gradient to determine an updated accumulated gradient;
      determining whether criteria for updating the values of the parameters of the deep neural network that are stored in the shared memory have been satisfied; and when the criteria for updating the current values of the parameters of the deep neural network that are stored in the shared memory have been satisfied:
determining updated values of the parameters of the deep neural network using the updated accumulated gradient and the values of the parameters of the deep neural network that are stored in the shared memory; and
storing the updated values of the parameters of the deep neural network in the shared memory accessible to all of the plurality of workers.

2. The system of claim 1, wherein each worker executes independently of each other worker on the same computer.

3. The system of claim 1, wherein the respective action selection policy for each worker is different from the respective action selection policy for each other worker.

4. The system of claim 1, the operations further comprising, when the criteria for updating the values of the parameters of the deep neural network that are stored in the shared memory have been satisfied, clearing the updated accumulated gradient.

5. The system of claim 1, wherein determining whether the criteria for updating the values of the parameters of the deep neural network that are stored in the shared memory have been satisfied comprises determining that a specified number of iterations of the reinforcement learning technique have been performed since a preceding update of the values of the parameters of the deep neural network that are stored in the shared memory.

6. The system of claim 1, wherein the deep neural network is a Q network that is configured to receive an input observation characterizing an input state of the environment and an input action and to generate a Q value that is an estimate of a long-term reward resulting from the input action being performed when the environment is in the input state, and wherein selecting the current action to be performed by the actor in response to the current observation comprises:
for each action in the predetermined set of actions, processing the current observation and the action using the deep neural network to generate a Q value for the action in accordance with the current values of the parameters of the deep neural network; and
selecting an action from the predetermined set of actions in accordance with the action selection policy for the worker using the Q values for the actions.

7. The system of claim 6, wherein the reinforcement learning technique is a Q-learning technique, and wherein performing the iteration comprises:
determining a maximum output of a target network for any of the actions in the predetermined set of actions when the environment replica is in the next state, wherein the target network is the same neural network as the Q network but with possibly different parameter values;
determining an error from the maximum output of the target network, the actual reward, and the Q value for the current action; and
determining the current gradient using the error.

8. The system of claim 6, wherein the reinforcement learning technique is a SARSA technique, and wherein performing the iteration comprises:
selecting a next action to be performed by the actor associated with the worker in response to the next observation in accordance with the respective action selection policy for the worker;
processing the next action and the next observation using a target network to determine a target network output for the next action, wherein the target network is the same neural network as the Q network but with possibly different parameter values;
determining an error from the target network output for the next action, the actual reward, and the Q value for the current action; and
determining the current gradient using the error.

9. One or more non-transitory computer-storage media storing instructions that when executed by one or more computers cause the one or more computers to implement a system for training a deep neural network used to select actions to be performed by an agent that interacts with an environment by performing actions selected from a predetermined set of actions, the system comprising:
a shared memory accessible to all of a plurality of workers, wherein the shared memory stores values of parameters of the deep neural network;
the plurality of workers, wherein each worker is configured to operate independently of each other worker, wherein each worker is associated with a respective actor that interacts with a respective replica of the environment during the training of the deep neural network, and wherein each worker is further configured to repeatedly perform operations comprising:
determining current values of the parameters of the deep neural network;
receiving a current observation characterizing a current state of the environment replica interacted with by the actor associated with the worker;
selecting a current action to be performed by the actor associated with the worker in response to the current observation in accordance with a respective action selection policy for the worker and using one or more outputs generated by the deep neural network in accordance with the current values of the parameters;
identifying an actual reward resulting from the actor performing the current action when the environment replica is in the current state;
receiving a next observation characterizing a next state of the environment replica interacted with by the actor, wherein the environment replica transitioned into the next state from the current state in response to the actor performing the current action;
performing an iteration of a reinforcement learning technique to determine a current gradient using the actual reward and the next observation;
updating an accumulated gradient with the current gradient to determine an updated accumulated gradient;
determining whether criteria for updating the values of the parameters of the deep neural network that are stored in the shared memory have been satisfied; and
when the criteria for updating the current values of the parameters of the deep neural network that are stored in the shared memory have been satisfied:
determining updated values of the parameters of the deep neural network using the updated accumulated gradient and the values of the parameters of the deep neural network that are stored in the shared memory; and
storing the updated values of the parameters of the deep neural network in the shared memory accessible to all of the plurality of workers.

10. The computer-storage media of claim 9, wherein each worker executes independently of each other worker on the same computer.

11. The computer-storage media of claim 9, wherein the respective action selection policy for each worker is different from the respective action selection policy for each other worker.

12. The computer-storage media of claim 9, the operations further comprising, when the criteria for updating the values of the parameters of the deep neural network that are stored in the shared memory have been satisfied, clearing the updated accumulated gradient.

13. The computer-storage media of claim 9, wherein determining whether the criteria for updating the values of the parameters of the deep neural network that are stored in the shared memory have been satisfied comprises determining that a specified number of iterations of the reinforcement learning technique have been performed since a preceding update of the values of the parameters of the deep neural network that are stored in the shared memory.

14. The computer-storage media of claim 9, wherein the deep neural network is a Q network that is configured to receive an input observation characterizing an input state of the environment and an input action and to generate a Q value that is an estimate of a long-term reward resulting from the input action being performed when the environment is in the input state, and wherein selecting the current action to be performed by the actor in response to the current observation comprises:
for each action in the predetermined set of actions, processing the current observation and the action using the deep neural network to generate a Q value for the action in accordance with the current values of the parameters of the deep neural network; and
selecting an action from the predetermined set of actions in accordance with the action selection policy for the worker using the Q values for the actions.

15. The computer-storage media of claim 14, wherein the reinforcement learning technique is a Q-learning technique, and wherein performing the iteration comprises:
determining a maximum output of a target network for any of the actions in the predetermined set of actions when the environment replica is in the next state, wherein the target network is the same neural network as the Q network but with possibly different parameter values;
determining an error from the maximum output of the target network, the actual reward, and the Q value for the current action; and
determining the current gradient using the error.

16. The computer-storage media of claim 14, wherein the reinforcement learning technique is a SARSA technique, and wherein performing the iteration comprises:
selecting a next action to be performed by the actor associated with the worker in response to the next observation in accordance with the respective action selection policy for the worker;
processing the next action and the next observation using a target network to determine a target network output for the next action, wherein the target network is the same neural network as the Q network but with possibly different parameter values;
determining an error from the target network output for the next action, the actual reward, and the Q value for the current action; and
determining the current gradient using the error.

17. A method of training a deep neural network used to select actions to be performed by an agent that interacts with an environment by performing actions selected from a predetermined set of actions, the method comprising:
using a plurality of workers to repeatedly update values of parameters of the deep neural network that are stored in a shared memory that is accessible to all of the plurality of workers, wherein each worker is configured to operate independently of each other worker, wherein each worker is associated with a respective actor that interacts with a respective replica of the environment during the training of the deep neural network, and wherein each worker is further configured to repeatedly perform operations comprising:
determining current values of the parameters of the deep neural network;
receiving a current observation characterizing a current state of the environment replica interacted with by the actor associated with the worker;
selecting a current action to be performed by the actor associated with the worker in response to the current observation in accordance with a respective action selection policy for the worker and using one or more outputs generated by the deep neural network in accordance with the current values of the parameters;
identifying an actual reward resulting from the actor performing the current action when the environment replica is in the current state;
receiving a next observation characterizing a next state of the environment replica interacted with by the actor, wherein the environment replica transitioned into the next state from the current state in response to the actor performing the current action;
performing an iteration of a reinforcement learning technique to determine a current gradient using the actual reward and the next observation;
updating an accumulated gradient with the current gradient to determine an updated accumulated gradient;
determining whether criteria for updating the values of the parameters of the deep neural network that are stored in the shared memory have been satisfied; and
when the criteria for updating the current values of the parameters of the deep neural network that are stored in the shared memory have been satisfied:
determining updated values of the parameters of the deep neural network using the updated accumulated gradient and the values of the parameters of the deep neural network that are stored in the shared memory; and
storing the updated values of the parameters of the deep neural network in the shared memory accessible to all of the plurality of workers.

18. The method of claim 17, wherein each worker executes independently of each other worker on the same computer.

19. The method of claim 17, wherein the respective action selection policy for each worker is different from the respective action selection policy for each other worker.

20. The method of claim 17, wherein the deep neural network is a Q network that is configured to receive an input observation characterizing an input state of the environment and an input action and to generate a Q value that is an estimate of a long-term reward resulting from the input action being performed when the environment is in the input state, and wherein selecting the current action to be performed by the actor in response to the current observation comprises:
- for each action in the predetermined set of actions, processing the current observation and the action using the deep neural network to generate a Q value for the action in accordance with the current values of the parameters of the deep neural network; and
- selecting an action from the predetermined set of actions in accordance with the action selection policy for the worker using the Q values for the actions.

* * * * *